(12) United States Patent
Arnold et al.

(10) Patent No.: US 7,852,879 B2
(45) Date of Patent: Dec. 14, 2010

(54) METHOD FOR TRANSMITTING REAL-TIME DATA MESSAGES IN A CYCLIC COMMUNICATIONS SYSTEM

(75) Inventors: Johann Arnold, Wendelstein (DE); Herbert Bernecker, Heilsbronn (DE); Dieter Brueckner, Unterleiterbach (DE); Franz-Josef Goetz, Heideck (DE); Dieter Klotz, Fuerth (DE); Juergen Schimmer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 1085 days.

(21) Appl. No.: 10/809,457

(22) Filed: Mar. 26, 2004

(65) Prior Publication Data

US 2005/0041690 A1      Feb. 24, 2005

Related U.S. Application Data

(63) Continuation of application No. PCT/DE02/03434, filed on Sep. 13, 2002.

(30) Foreign Application Priority Data

Sep. 26, 2001  (DE) .................. 101 47 435
Aug. 2, 2002   (DE) .................. 102 35 436

(51) Int. Cl.
*H04J 1/02* (2006.01)
(52) U.S. Cl. .................... 370/493
(58) Field of Classification Search ........... 370/445, 370/493; 375/259
See application file for complete search history.

(56) References Cited

U.S. PATENT DOCUMENTS

| 5,390,132 | A   | * | 2/1995  | Shioe et al. ............. 709/224 |
| 5,654,969 | A   | * | 8/1997  | Wilhelmsson ............ 370/460 |
| 6,055,242 | A   |   | 4/2000  | Doshi et al. |
| 6,473,425 | B1  |   | 10/2002 | Bellaton et al. |
| 6,483,846 | B1  | * | 11/2002 | Huang et al. ............ 370/445 |
| 6,505,247 | B1  | * | 1/2003  | Steger et al. ............ 709/224 |
| 6,754,226 | B1  | * | 6/2004  | Nakano .................. 370/466 |

(Continued)

FOREIGN PATENT DOCUMENTS

DE    100 58 524 A1    6/2002

(Continued)

OTHER PUBLICATIONS

Technical Short Description, SERCOS Interface, "The Internationally-Standardized Digital Interface for Communication Between Controllers and Drives in Numerically-Controlled Machines", Aug. 1998, pp. 1-22.

(Continued)

*Primary Examiner*—Ricky Ngo
*Assistant Examiner*—Chandrahas Patel
(74) *Attorney, Agent, or Firm*—Staas & Halsey LLP (57) ABSTRACT

A method for transmitting real time data packets in a cyclic communication system, each transmission cycle having a first partial cycle (IRT-Z) for a real time communication portion and a second partial cycle (NRT-Z) for a non-real-time communication portion. The method includes determination (118) of a cycle number and processing of a transmission sequence of real time data packets in the first partial cycle. The transmission sequence is composed of one or more partial sequences (1, 2, 3, 4, 5), and the composition depends on the cycle number.

24 Claims, 3 Drawing Sheets

U.S. PATENT DOCUMENTS

| | | |
|---|---|---|
| 2001/0002195 A1 | 5/2001 | Fellman et al. |
| 2002/0064157 A1 | 5/2002 | Krause |
| 2009/0034524 A1 | 2/2009 | Krause |

FOREIGN PATENT DOCUMENTS

| | | |
|---|---|---|
| EP | 0 912 028 A2 | 4/1999 |
| EP | 1 073 251 A2 | 1/2001 |

OTHER PUBLICATIONS

Interessengemeinschaft Sercos Interface e.V, IEC 61491, EN 61491-System Interface, Technische Kurzbeschreibung.

Reference AI (DE 100 58 524 A1) corresponds to Reference AE (US 2009/0034524).

Communication from the German Patent Office mailed on Nov. 8, 2006 in the related German patent application.

Communication from the European Patent Office mailed on Jul. 5, 2010 in the related European patent application.

* cited by examiner

METHOD FOR TRANSMITTING REAL-TIME DATA MESSAGES IN A CYCLIC COMMUNICATIONS SYSTEM

This is a Continuation of International Application PCT/DE02/03434, with an international filing date of Sep. 13, 2002, which was published under PCT Article 21(2) in German, the disclosure of which is incorporated into this application by reference.

FIELD AND BACKGROUND OF THE INVENTION

The present invention relates generally to a method for transmitting real-time data packets in a cyclic communication system having transmission cycles that can be used for both real-time communication and non-real-time communication. More particularly, the invention relates to a corresponding communication system and a user of such a communication system.

A synchronous, clocked communication system with equidistance properties is a system that consists of at least two users interconnected via a data network for the purpose of mutually exchanging data or mutually transmitting data. The data exchange occurs cyclically in equidistant communication cycles that are predefined by the communication clock used in the system.

Users are, for example; central automation devices; programming, configuration or operating devices; peripheral devices, such as, input/output modules, drives, actuators, sensors, stored program controllers (SPCs) or other control units; and computers or similar machines that exchange electronic data with other machines, in particular, process data of other machines. Users are also referred to as network nodes or simply nodes.

The term control units as used hereinafter means closed loop or open loop control units of any kind, for example, coupling units (so-called switches) and/or switch controllers. The data networks used are, for example, bus systems, e.g., field bus, Profibus, Ethernet, Industrial Ethernet, FireWire or PC-internal bus systems (PCIs), etc., in particular, Isochronous Realtime Ethernet.

Data networks enable communication among a plurality of users through networking, i.e., the connection of the individual users among each other. Communication means the transmission of data between users. Data to be transmitted is sent as data messages, i.e., data is bundled into a plurality of packets and in this form is sent over the data network to the corresponding recipient. Such packets are known as data packets. The term data transmission as used in this document is completely synonymous with the aforementioned transmission of data messages or data packets.

U.S. Pat. No. 6,055,242 ('242) discloses a method and a device using a Broadband Link Protocol (BLP), which supports the use of a plurality of interactive and non-interactive digital services by means of HFC networks. In accordance with the method disclosed in the '242 patent, synchronous transfer mode (STM) information, variable length (VL) information and asynchronous transfer mode (ATM) cells can be transmitted.

In distributed automation systems, e.g., in the field of drive technology, specific data must arrive at specific times at the destined users and be processed by the recipients. This type of data transfer is often referred to as real-time critical data or data traffic because the failure of the data to arrive on-time at the destination leads to undesirable results with respect to the user. This contrasts with non-real time critical, e.g., Internet-based or intranet-based, data communication. In accordance with IEC 61491, EN61491 SERCOS Interface—Brief Technical Description, which can be viewed, for example, at the following website: http://www.sercos.de/pdf/sercos_kurzbeschreibung_de_0202.pdf, successful real-time critical data traffic of the aforementioned type can be guaranteed in distributed automation systems.

Today, automation components, (e.g., controls, drives, etc.) generally have an interface to a cyclically clocked communication system. An operation level of the automation component known as fast cycle, (e.g., position control in a control unit, torque control of a drive) is synchronized to the communication cycle. This determines the communication clock. Other, low-performance algorithms, known as slow cycle (e.g., temperature controls) of the automation system can likewise only communicate with other components (e.g., binary switches for fans, pumps, etc.) via this communication clock, although a slower cycle would be sufficient. Using only a single communication clock for transmitting all the information in the system places high demands on the bandwidth of the transmission path.

A peripheral image is composed of a sum of data sets exchanged with other automation devices through real-time communication. Data sets received by an automation device through real-time communication are input data. Data sets sent by an automation device through real-time communication are output data. In an automation device, input data are processed in a cyclically-called application program and output data are generated. The application program can be composed of a plurality of different functions that work with different data sets at different times. It is not necessary to call all the functions of the application program in each application cycle. As a result, not all input data is processed and new output data is generated in each application cycle.

Until now, in cyclic real-time communication, all the data of a peripheral image have been exchanged in each communication cycle, regardless of whether the input data were processed or new output data generated in each application cycle.

OBJECTS OF THE INVENTION

Thus, an object of the present invention is to provide an improved method for transmitting real-time data packets via a cyclic communication system, particularly Realtime Ethernet, as well as a corresponding improved communication system and a user of such a communication system.

SUMMARY OF THE INVENTION

The above and other objects of the invention are attained, respectively, by the features of the corresponding independent claims. Preferred embodiments of the invention are set forth in the dependent claims.

According to the invention, a transmission cycle is divided into a partial cycle for the planned real-time communication and another partial cycle for the unplanned non-real-time communication. The transmission sequence to be processed in a partial cycle for the real-time communication is not static for all transmission cycles but is dynamically programmable as a function of the cycle number.

According to a preferred embodiment of the invention, various partial sequences are predefined for the partial cycle for the real-time communication. A transmission sequence to be processed in a current partial cycle is dynamically composed of the predefined partial sequences as a function of the cycle number. As a result, it is possible according to the invention that not all transmission sequences contain all the occurring data packets, but that data packets whose user data has not changed can be omitted.

According to another preferred embodiment of the invention, the transmission sequence is configured as a receive sequence and/or a send sequence of a user of the communication system.

According to yet another preferred embodiment of the invention, the division of a transmission cycle into a partial cycle for the real-time communication and a partial cycle for the non-real-time communication is adapted to the transmission sequence that is currently to be processed. This makes it possible to minimize the length of the partial cycle for the real-time communication required to process the transmission sequence in each transmission cycle, such that a maximum length remains for the second partial cycle for the non-real-time communication.

According to another preferred embodiment of the invention, the transmission sequence is generated from a dynamic transmission list, which includes the predefined partial sequences of real-time data packets to be transmitted and conditional control commands. The conditional control commands include conditional jumps or stop commands, with the condition being based on the cycle number.

According to another preferred embodiment of the invention, a communication system is used such as the system disclosed in German Application DE 100 58 524.8. Such a communication system enables a mixed operation of real-time critical and non-real-time critical, particularly Internet-based or Intranet-based, data communication.

This enables both real-time critical (RT) and non-real-time critical (NRT) communication in a switchable data network consisting of users and coupling units, e.g., a distributed automation system, through cyclic operation. In a so-called transmission cycle, there is at least one range for transmitting real-time critical data and at least one range for transmitting non-real-time critical data for all the users and coupling units of the switchable data network, such that the real-time critical communication is separated from the non-real-time critical communication.

Since all the users and coupling units are always synchronized to a common time basis, the corresponding ranges for transmitting data occur at the same instant for all users and coupling units, i.e., the real-time critical communication takes place chronologically independent of the non-real-time critical communication and is, therefore, not influenced by the latter. The real-time critical communication is planned in advance. The input of the data packets at the original sender and their forwarding by means of the coupling units involved is time-based. Intermediate storage in the corresponding coupling units makes it possible to shift Internet-capable non-real-time critical communication that occurs spontaneously at any time to the transmission range of a transmission cycle provided for the non-real-time critical communication and to transmit it only in that range.

A transmission cycle is divided, for example, into a first range provided for the transmission of the real-time-critical data and a second region provided for the transmission of the non-real-time critical data. The length of the depicted transmission cycle symbolizes its length in time, which advantageously lasts between one microsecond and ten seconds depending on the application.

The duration of a transmission cycle can be changed, but it is defined at least once before the instant of data transmission, e.g., by a control computer, and is equally long for all the users and coupling units of the switchable data network. The duration of a transmission cycle and/or the duration of the first range provided for the transmission of the real-time critical data can be changed at any time, e.g., at fixed instants planned in advance and/or after a planned number of transmission cycles, preferably prior to the start of a transmission cycle. For this purpose, the control computer switches, for example, to other planned real-time critical transmission cycles.

In addition, the control computer can at any time during the ongoing operation of an automation system re-plan the real-time communication depending on the requirements, which also makes it possible to change the length of a transmission cycle. The absolute length of a transmission cycle is a measure of the time quota or the bandwidth of the non-real-time critical communication during a transmission cycle, i.e., the time that is available for the non-real-time critical communication. For example, the non-real-time critical communication for a transmission cycle of 500 usec has a bandwidth of 30% and at 10 msec a bandwidth of 97%.

In the first range provided for the transmission of real-time critical data, a certain time period is reserved for sending data packets to organize the data transmission before the actual real-time critical data packets are sent.

The data packets for organizing the data transmission contain, for example, data for time synchronization of the users and coupling units of the data network and/or data for detecting the topology of the network. After these data packets have been sent, the real-time critical data packets are sent.

Because the real-time communication can be planned in advance due to the cyclic operation, the send instants or the forwarding instants of the real-time critical data packets are known before the start of data transmission for all the real-time critical data packets to be transmitted. In other words, the duration of the range for transmitting non-real-time critical data is automatically determined by the duration of the range for transmitting real-time critical data.

The advantage of this arrangement is that only the necessary transmission time for the real-time critical data traffic is used. After completion of this data traffic, the remaining time is automatically available for the non-real-time critical communication, e.g., for the non-plannable Internet communication or for other non-real-time critical applications.

It is particularly advantageous that the duration of the range for transmitting real-time critical data is determined, respectively, by the connection-specific data to be transmitted. In other words, the duration of the two ranges is determined for each individual data connection by the respectively necessary amount of data of the real-time critical data to be transmitted. As a result, the time division of the two ranges for each individual data connection can differ for each transmission cycle. Only the necessary transmission time for the real-time critical data traffic is used. The remaining time of a transmission cycle is automatically available for the non-real-time critical communication, e.g., for the non-plannable Internet communication or for other non-real-time critical applications for all users of the switchable data network.

Because the real-time communication is planned in advance in such a way that the real-time critical data packets arrive at the corresponding coupling units no later than by the forwarding instant, or earlier, the real-time critical data packets can be sent or forwarded without a time gap. As a result of this densely packed sending and forwarding the available time is optimally used. It is of course also possible to include send pauses if necessary between the transmission of the individual data packets.

According to a preferred embodiment of the invention, a switched network has at least two users, e.g., a drive and a control computer, each with integrated coupling units and an additional user without coupling unit, which are interconnected by data connections. The coupling units each have local memories, which are connected with the users via internal interfaces. The users exchange data with the corresponding coupling units via the interfaces.

Within the coupling units, the local memories are connected with the control units via data connections. The control units receive data or forward data via the internal data connections from or to the local memories or via one or more of the external ports. Because the method of time synchronization is used, the coupling units always have a common, synchronous time basis.

If a user has real-time critical data, the corresponding control unit fetches these data at the planned instant during the range reserved for the real-time critical communication via the corresponding interface and the local memory and sends them to the next connected coupling unit via the provided external port. If another user sends non-real-time critical data, e.g., for an Internet query, at the same time, i.e., during the real-time critical communication, the control unit receives these data via the external port and forwards them to the local memory via an internal connection where they are intermediately stored.

From the local memory, these data are fetched only during the range reserved for non-real-time critical communication and are forwarded to the recipient. In other words, they are shifted into the second range of the transmission cycle, which is reserved for the spontaneous non-real-time critical communication. Interference with real-time communication is, thus, avoided.

If it is not possible to transmit all intermediately stored non-real-time critical data during the range of a transmission cycle provided for the transmission of the non-real-time critical data, the data are intermediately stored in the local memory of the corresponding coupling unit until they can be transmitted during a range provided for the transmission of the non-real-time critical data of a later transmission cycle. Interference with the real-time communication is again excluded in any case.

The real-time critical data packets arriving in the control unit of the associated coupling unit via corresponding data connections through the external ports are immediately forwarded via the corresponding external ports. This is possible because the real-time communication is planned in advance, such that for all real-time critical data packets to be transmitted, the send and receive instant, all the coupling units involved as well as all forwarding instants and all the recipients of the real-time critical data packets are known.

Advance planning of the real-time communication also ensures that no data collisions occur on the data connections. The forwarding instants of all real-time critical data packets from the corresponding coupling units involved are likewise planned in advance and are thus uniquely defined. The arrival of the real-time critical data packets is therefore planned in such a way that the real-time critical data packets arrive in the control unit of the corresponding coupling unit no later than by the forwarding instant, or earlier. The problem of fuzzy timing, which is particularly noticeable in long transmission chains, is thereby eliminated. As described above, this enables simultaneous operation of real-time critical and non-real-time critical communication in one and the same switchable data network as well as any connection of additional users to the switchable data network without interference with the real-time communication itself.

By applying the above-described principle, the real-time data that are cyclically exchanged between nodes (e.g., open-loop controls, closed-loop controls, etc.) are located in a peripheral image memory and are cyclically processed by an application program that runs on the node. This cyclic processing in each cycle can occur synchronously to the communication cycle, or to the multiple of a communication cycle. In controls, processing of real-time data may also be done asynchronously to the communication cycle. It is not absolutely necessary for all real-time data of a peripheral image to be exchanged in a communication cycle.

Thus, the invention makes it possible that not all data of the peripheral image must be exchanged in each communication cycle. This can in particular have the following advantages:

The communication cycle is substantially faster than the change frequency of the data, e.g., temperature data, in the peripheral image. According to the invention, the transmission of data packets with unchanged user data can be eliminated by dynamically adapting the transmission sequence.

All the data of the peripheral image are not processed in each communication cycle by an application program. The application program can, for instance, consist of several functions, which are not executed in each communication cycle. Even if user data of a data packet change, these data may possibly not be required because the application program may be executing a different function at the time.

In an Isochronous Realtime Ethernet (IRTE), a very high bandwidth can be provided for the standard Ethernet communication in the NRT time range.

According to a preferred embodiment of the invention, the communication system disclosed in the German Application DE 100 58 524.8 is further refined such that the real-time range or the isochronous real-time (IRT) range of a transmission cycle is divided into partial sequences. The IRT range of a transmission cycle is hereinafter referred to as the macrocycle and the partial sequences as the microcycles.

In each macrocycle certain real-time data from the peripheral image must be exchanged. Job lists are provided to send the real time data cyclically. A job list is composed of linked control structures. Each control structure of the job list describes what data from the peripheral image is to be sent to whom and at which point in the communication cycle. The job list also contains additional control structures, which determine whether other real time packets are to be sent in the current communication cycle or whether the end of the processing of the job list has been reached for the current communication cycle.

Control commands in the job list can be used to control which real-time data are transmitted in which isochronous communication cycle. In an Isochronous Real-Time Ethernet (IRTE) coupling unit, there is a job list, respectively, at each send and receive port for the IRTE communication.

It is furthermore particularly advantageous that the disclosed methods can be used in automation systems, particularly in packaging machines, presses, plastic injection molding machines, textile machines, printing machines, machine tools, robots, handling systems, wood processing machines, glass processing machines, ceramics processing machines as well as lifting equipment.

BRIEF DESCRIPTION OF THE DRAWINGS

The preferred embodiments of the invention will now be described, by way of example, with reference to the drawings in which.

DETAILED DESCRIPTION OF THE PREFERRED EMBODIMENTS

Figure 1:
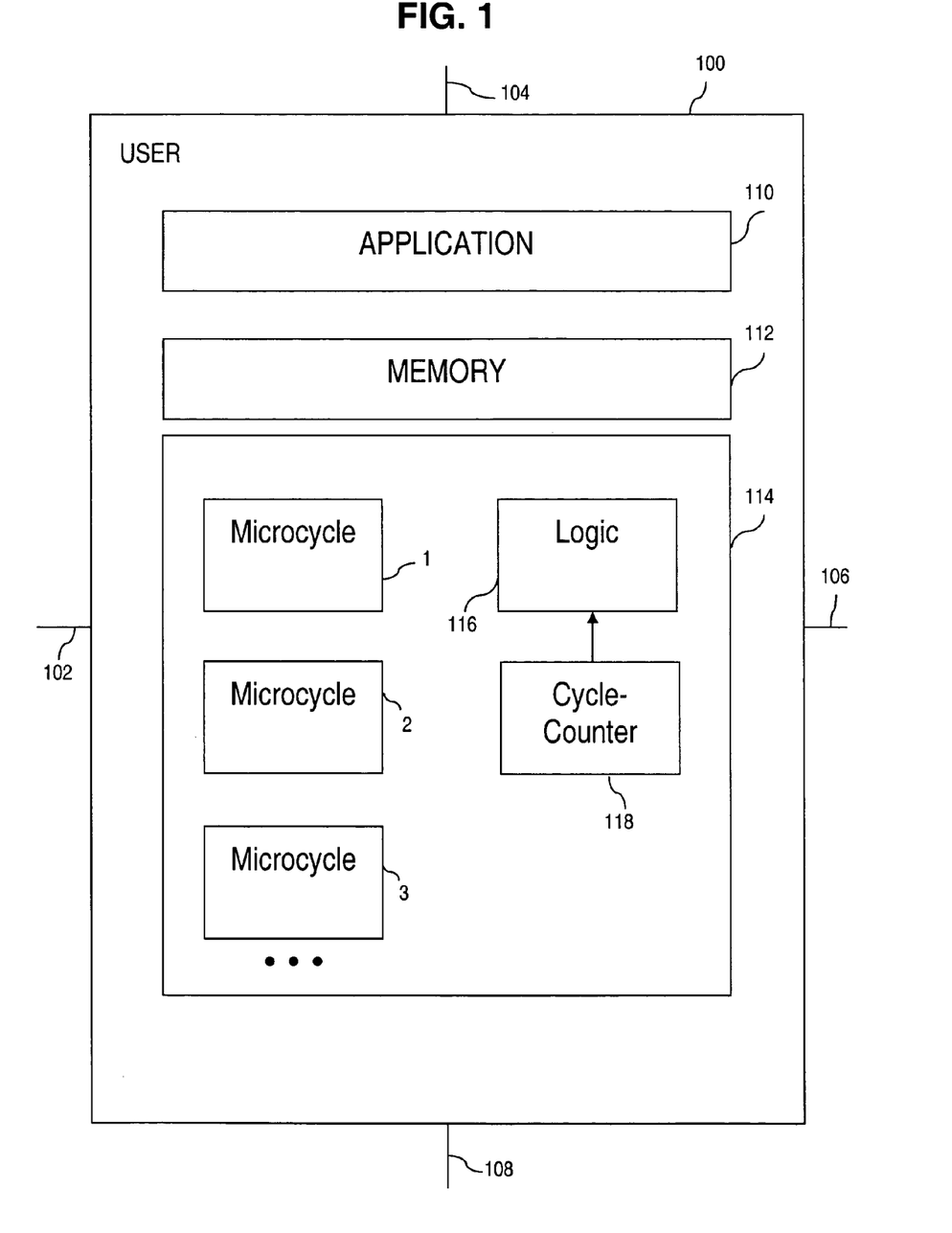
FIG. 1 is a block diagram of an embodiment of a user according to the invention.

FIG. 1 shows a user 100 of an isochronous, cyclic communication system in which transmission cycles can be divided into an IRT part and an NRT part. The communication system has other users, which are in principle structured in the same manner as the user 100.

The user 100 has various send and/or receive ports 102, 104, 106 and 108. Via the ports 102 to 108 the user 100 sends and/or receives real-time and non-real time data packets from other users of the communication system.

The user 100 has an application program 110 that implements, for example, an open loop or closed loop process. For open loop or closed loop control, the program 110 continuously requires user data and for this purpose accesses the memory 112. The program 110 also stores output data in the memory 112. Accordingly, the memory 112 is also referred to as a communication memory.

The user 100 further has a module 114, which is used to generate a transmission sequence of IRT data packets to be sent or received in a transmission cycle. The module 114 is assigned to the port 102. Preferably, each port of the user 100 has a dedicated module 114.

The module 114 has a number of partial sequences of data packets to be sent or received. These partial sequences are stored in the module 114 as microcycles 1, 2, 3, .... Each of these microcycles 1, 2, 3, ... consists of a list of data packets to be sent or received. Each entry in the list includes the identifier of the respective data packet and an address for the corresponding user data in the memory 112.

The module 114 further has a logic portion 116, which is made available, for example, by a correspondingly programmed microprocessor or by an application-specific integrated circuit (ASIC). The logic portion 116 is linked to a cycle counter 118.

During operation of the user 100, the logic portion 116 accesses the current counter status of the cycle counter 118 to determine the cycle number of the subsequent transmission cycle. Based on this cycle number, the logic portion 116 compiles the transmission sequence to be processed in the IRT part of the subsequent transmission cycle by selecting one or more of the microcycles 1, 2, 3, ... and compiling them into the transmission sequence.

The composition of a current transmission sequence consisting of microcycles 1, 2, 3, ... to be processed in a transmission cycle is thus not static but dynamically depends on the cycle number. In this manner, the type and number of the data packets to be transmitted in the IRT part of the communication cycle varies depending on the change frequency of the user data and/or the requirements of the program 110.

Figure 2:
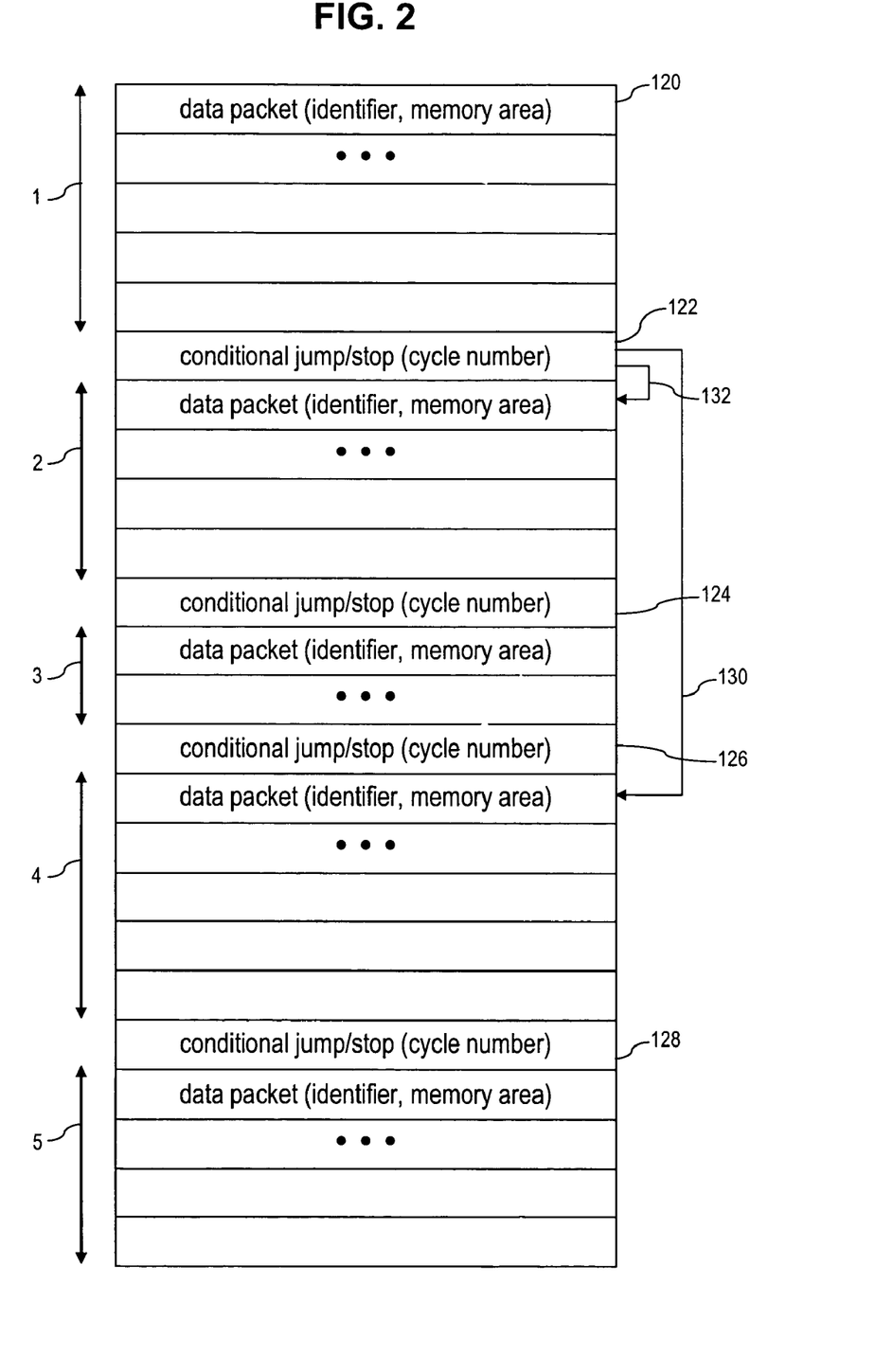
FIG. 2 is an embodiment of a dynamic transmission list with partial sequences and conditional control commands.

FIG. 2 shows an embodiment of the module 114 of FIG. 1.

In the embodiment of FIG. 2, the module 114 (FIG. 1) is based on a dynamic transmission list 120, which contains the microcycles 1, 2, 3, ... as well as other conditional control commands.

In the example considered here, the transmission list 120 starts with the micro cycle 1, which is followed by a control command 122.

The control command 122 is followed by the microcycle 2, which in turn is followed by the control command 124. This is followed by the microcycle 3, the control command 126, the microcycle 4, the control command 128 and the microcycle 5.

Each of the control commands contains one or more conditional jumps in the transmission list 120 and/or a conditional stop. Each condition depends on the cycle number.

For example, the control command 122 includes a conditional jump 130 to the microcycle 4 and a conditional jump 132 to the microcycle 2 as well as other conditional jumps, which for the sake of clarity are not depicted in FIG. 2.

Figure 3:
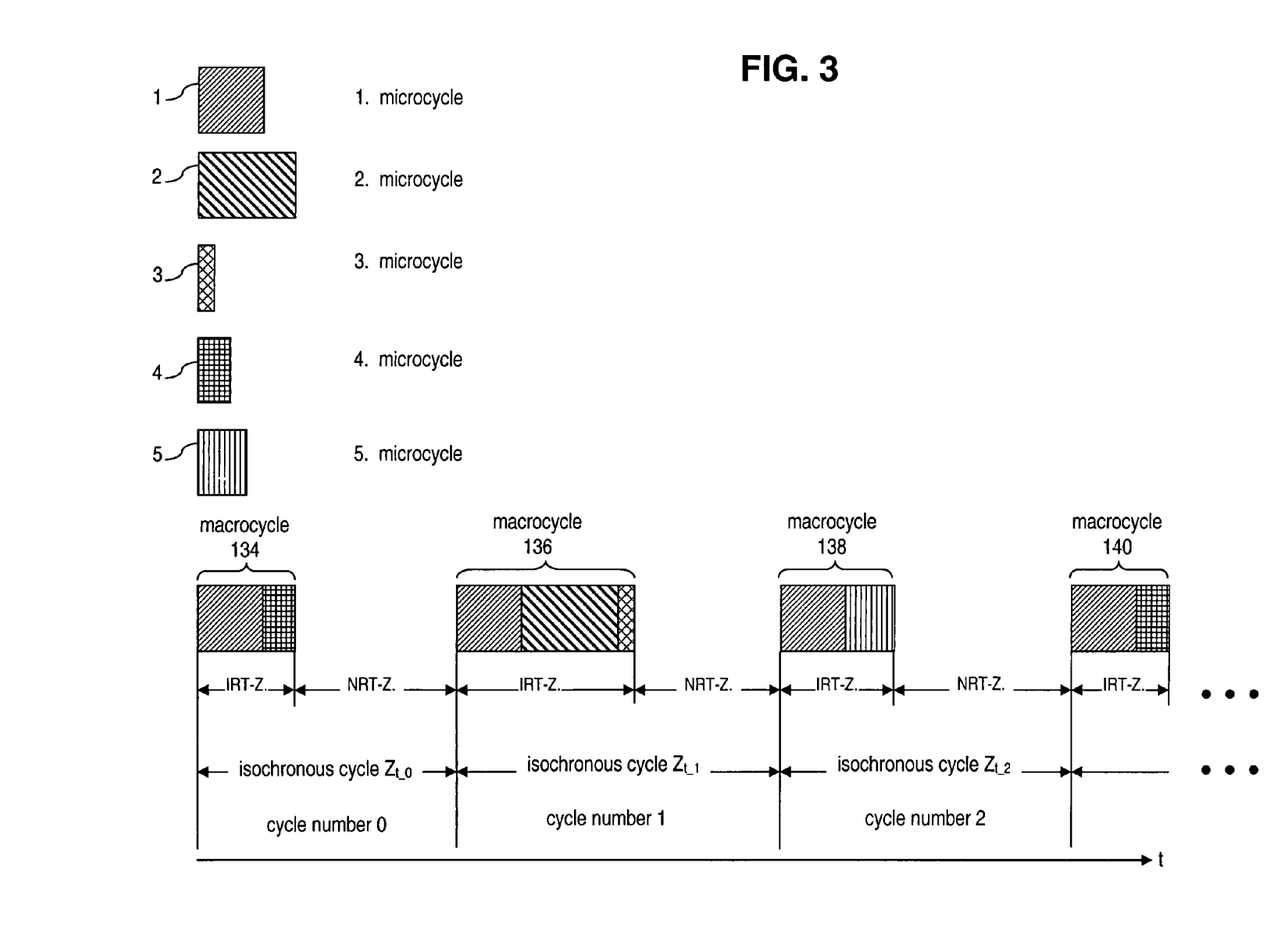
FIG. 3 illustrates the dynamic division of successive transmission cycles.

FIG. 3 illustrates the dynamic composition of the transmission sequences in successive transmission cycles.

Microcycles 1 to 5 are symbolized by different hatchings. The transmission cycles with the cycle number 0, 1 and 2 are represented along the time axis t. In FIG. 3 the corresponding transmission cycles are labeled isochronous cycle $Z_{t\_0}$, isochronous cycle $Z_{t\_1}$, isochronous cycle $Z_{t\_2}$, ....

Each of the isochronous cycles is composed of a partial cycle for the real-time communication "IRT-Z" and a partial cycle for the non-real-time communication "NRT-Z."

The partitioning of an isochronous cycle into the IRT part and the NRT part dynamically depends on the cycle number. For example, the IRT part of the isochronous cycle $Z_{t\_0}$ consists of the microcycles 1 and 4, which make up the macrocycle 134. This is followed by the NRT part of the transmission cycle, which fills the remaining time in the transmission cycle within cycle number 0.

This corresponds to a processing of the transmission list 120 starting with the microcycle 1. Thereafter, the control command 122 is executed, i.e., because of the cycle number "0," a conditional jump 130 (cf. FIG. 2) to the microcycle 4. The control command 122 then terminates the transmission list 120 for the cycle with the cycle number 0.

Correspondingly, the macrocycle 136 of the subsequent isochronous cycle with the cycle number 1 is composed of the microcycles 1, 2 and 3. Thus, the jump 132 (cf. FIG. 2) occurs in the macrocycle 136 of the transmission cycle with the cycle number 1.

In contrast, the macrocycle 138 of the transmission cycle of the cycle number 2 is composed of the microcycles 1 and 5. The subsequent transmission cycle of the cycle number 3 has the macrocycle 140 with the microcycles 1 and 4.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for transmitting real-time data packets in a cyclic communication system, wherein each of a plurality of transmission cycles has a first partial cycle for transmitting real-time communication and a second partial cycle for transmitting non-real-time communication, the method comprising:

pre-planning the real-time communication before the communication starts;

determining a cycle number of a particular transmission cycle; and processing a transmission sequence of real-time data packets within the first partial Cycle of the particular transmission cycle, wherein the transmission sequence is composed of one or more partial sequences, the composition of which depends on the cycle number determined for the particular transmission cycle, wherein the cycle number determines which of the partial sequences are transmitted in the particular transmission cycle, and wherein the pre-planning comprises defining a duration of each of the plurality of transmission cycles.

2. A method as claimed in claim 1, wherein times for forwarding each of one or more real-time critical data packets are planned in advance.

3. A method as claimed in claim 1, wherein the transmission sequence is a receive sequence or a send sequence of a user of the communication system.

4. A method as claimed in claim 1, wherein a length of the first partial cycle is selected as a function of the transmission sequence.

5. A method as claimed in claim 1, wherein the transmission sequence is generated from a dynamic transmission list comprising one or more partial sequences and one or more conditional control commands, wherein a corresponding condition for each of the conditional control commands is based on the cycle number of the particular transmission cycle.

6. A user of a cyclic communication system that is operable to transmit one or more transmission cycles each of which has a first partial cycle for real-time communication and a second partial cycle for non-real-time communication, wherein the real-time communication is pre-planned in advance before the communication starts, the user comprising:

means for determining a cycle number of a particular one of the transmission cycles; and means for processing a transmission sequence within a first partial cycle of the particular transmission cycle, wherein the transmission sequence is composed of one or more partial sequences the composition of which depends on the cycle number of the particular transmission cycle, wherein the cycle number determines which of the partial sequences are transmitted in the particular transmission cycle, and wherein a pre-planning of the real-time communication comprises defining a duration of each of the plurality of transmission cycles.

7. A user as claimed in claim 6, wherein the transmission sequence is configured as a receive sequence or a send sequence of the user.

8. A user as claimed in claim 6 further comprising means for selecting a length of a first partial cycle of the particular cycle as a function of the transmission sequence.

9. A user as claimed in claim 6, further comprising means for generating the transmission sequence from a dynamic transmission list which further comprises one or more partial sequences and one or more conditional control commands, wherein a corresponding condition for each of the conditional control commands is based on the cycle number of the particular transmission cycle.

10. A cyclic communication system with at least a first and a second user, wherein each of one or more transmission cycles has a first partial cycle for real-time communication and a second partial cycle for non-real-time communication, wherein the real-time communication is pre-planned in advance before the communication starts, and the first and the second users comprise:

means for determining a cycle number of a particular transmission cycle; and means for processing a transmission sequence in the first partial cycle of the particular transmission cycle, wherein the transmission sequence is composed of one or more partial sequences the composition of which depends on the determined cycle number, wherein the cycle number determines which of the partial sequences are transmitted in the particular transmission cycle, and wherein a pre-planning of the real-time communication comprises defining a duration of each of the plurality of transmission cycles.

11. A cyclic communication system as claimed in claim 10, wherein the transmission sequence is configured as a receive sequence or a send sequence.

12. A cyclic communication system as claimed in claim 10, further comprising means for selecting a length of a first partial cycle as a function of the transmission sequence.

13. A cyclic communication system as claimed in claim 10, further comprising means for generating the transmission sequence from a dynamic transmission list which further comprises one or more partial sequences and one or more conditional control commands, wherein a corresponding condition for each of the conditional control commands is based on the cycle number of the particular transmission cycle.

14. A communication system operable to isochronously transmit data between respective users during transmission cycles, the system comprising:

a network operable to connect the users;

an application program corresponding to a first user;

a memory portion corresponding to the first user and operable to store user data to facilitate control of the first user, and output data to be transmitted over said network to a second user;

a cycle counter corresponding to the first user and operable to count the transmission cycles corresponding to a communication between the first user and the second user; and a processing portion corresponding to the first user and operable to determine a number of a subsequent transmission cycle, wherein the output data is transmitted from the first user to the second user during the subsequent transmission cycle which is divided into a real-time partial cycle and a non-real-time partial cycle in a manner that depends on the cycle number determined by said processing portion, wherein the cycle number determines which of the partial sequences are transmitted in the subsequent transmission cycle, wherein a real-time communication is pre-planned before the communication starts, and wherein a pre-planning of the real-time communication comprises defining a duration of the transmission cycles.

15. A communication system as claimed in claim 14, wherein the real-time partial cycle comprises one or more microcycles and a transmission sequence of the one or more microcycles is dynamically programmed based on the cycle number determined by said processing portion.

16. A communication system as claimed in claim 15, wherein the transmission sequence is predefined prior to commencement of the communication between the first and second users.

17. A communication system as claimed in claim 14, wherein the network comprises a network based on at least one of FieldBus, Profibus, Ethernet, Industrial Ethernet, FireWire, PC-internal bus systems (PCIs) and Isochronous Realtime Ethernet.

18. The method as claimed in claim 1, wherein, based on the planning of the real-time communication, only updated data of the real-time data packets is transmitted in the transmission cycles.

19. The method as claimed in claim 18, wherein the real-time data packets comprise a peripheral image and wherein unmodified portions of the peripheral image are not transmitted in the real-time communication cycle.

20. The method as claimed in claim 5, wherein the conditional control commands utilize the cycle number to identify which ones of the partial sequences are to be transmitted in the particular cycle.

21. A method for transmitting real-time data packets in a cyclic communication system, wherein each of a plurality of transmission cycles has a first partial cycle for transmitting real-time communication and a second partial cycle for transmitting non-real-time communication, the method comprising:

planning the real-time communication;

determining a cycle number of a particular transmission cycle; and processing a transmission sequence of real-time data packets within the first partial cycle of the particular transmission cycle, wherein the transmission sequence is composed of one or more partial sequences, the composition of which depends on the cycle number determined for the particular transmission cycle, wherein the cycle number determines which of the partial sequences are transmitted in the particular transmission cycle, and wherein each partial cycle for transmitting real-time communication comprises microcycles, and wherein only isochronous real-time communication is transmitted in the microcycles.

22. The user as claimed in claim 6, wherein each partial cycle for real-time communication comprises microcycles, and wherein only isochronous real-time communication is transmitted in the microcycles.

23. The cyclic communication system as claimed in claim 10, wherein each partial cycle for real-time communication comprises microcycles, and wherein only isochronous real-time communication is transmitted in the microcycles.

24. A communication system operable to isochronously transmit data between respective users during transmission cycles, the system comprising:

a network operable to connect the users;

an application program corresponding to a first user;

a memory portion corresponding to the first user and operable to store user data to facilitate control of the first user, and output data to be transmitted over said network to a second user;

a cycle counter corresponding to the first user and operable to count the transmission cycles corresponding to a communication between the first user and the second user; and a processing portion corresponding to the first user and operable to determine a number of a subsequent transmission cycle, wherein the output data is transmitted from the first user to the second user during the subsequent transmission cycle which is divided into a real-time partial cycle and a non-real-time partial cycle in a manner that depends on the cycle number determined by said processing portion, wherein the cycle number determines which of the partial sequences are transmitted in the subsequent transmission cycle, and wherein each partial cycle for real-time communication comprises microcycles, and wherein only isochronous real-time communication is transmitted in the microcycles.

* * * * *